(12) United States Patent
Cook (10) Patent No.: US 7,444,148 B1
(45) Date of Patent: Oct. 28, 2008

(54) TEMPORARY WIRELESS NUMBER COMMUNICATION SYSTEM

(75) Inventor: Fred S. Cook, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 529 days.

(21) Appl. No.: 09/702,644

(22) Filed: Oct. 31, 2000

(51) Int. Cl.
*H04Q 7/20* (2006.01)
*H04M 3/42* (2006.01)
*H04Q 7/22* (2006.01)
*H04Q 7/38* (2006.01)

(52) U.S. Cl. ............. 455/435.1; 455/414.1; 455/445; 455/461

(58) Field of Classification Search ............. 455/435, 455/414, 446, 461, 435.1, 414.1, 414.3, 445, 455/422.1, 404.1, 405
See application file for complete search history.

(56) References Cited

U.S. PATENT DOCUMENTS

| | | | |
|---|---|---|---|
| 5,319,699 A | 6/1994 | Kerihuel et al. | |
| 5,590,184 A | 12/1996 | London | |
| 5,694,463 A | 12/1997 | Christie et al. | |
| 5,793,853 A | 8/1998 | Sbisa | |
| 5,870,459 A * | 2/1999 | Phillips et al. | 455/409 |
| 5,933,486 A | 8/1999 | Norby et al. | |
| 6,038,437 A | 3/2000 | Zicker | |
| 6,091,953 A * | 7/2000 | Ho et al. | 455/433 |
| 6,631,275 B1 * | 10/2003 | Martin et al. | 455/560 |
| 6,970,719 B1 * | 11/2005 | McConnell et al. | 455/554.1 |

FOREIGN PATENT DOCUMENTS

| | | |
|---|---|---|
| EP | 0986237 A2 | 3/2000 |
| WO | WO-97/45988 | 12/1997 |

OTHER PUBLICATIONS

U.S. Appl. No. 09/276,290, filed Dec. 7, 1995.
Briere, Daniel, "Sprint plans 'sweeping' network revisions"," Network World, vol. 10 (No. 38), p. 1 and 10, (Sep. 20, 1993).
U.S. Appl. No. 09/063,902, filed Apr. 21, 1998.
U.S. Appl. No. 08/988,909, filed Dec. 11, 1997.
U.S. Appl. No. 09/324,277, filed Jun. 2, 1999.
U.S. Appl. No. 09/345,936, filed Jul. 1, 1999.
U.S. Appl. No. 09/346,758, filed Jul. 1, 1999.
U.S. Appl. No. 09/368,811, filed Aug. 5, 1999.
U.S. Appl. No. 09/368,797, filed Aug. 5, 1999.

* cited by examiner

*Primary Examiner*—Matthew Anderson
*Assistant Examiner*—Eugene Yun (57) ABSTRACT

A communication system for providing temporary wireless telephone numbers to wireless call devices. The communication system comprising a first switching system and a service control point. The first switching system is configured to receive a registration request from a wireless call device and process the registration request to generate a registration message for the service control point that includes a request registration information. The service control point is configured to receive the registration message and process the registration message to automatically assign a temporary wireless telephone number to the wireless call device.

35 Claims, 7 Drawing Sheets

TEMPORARY WIRELESS NUMBER COMMUNICATION SYSTEM

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention relates to telecommunication systems, and specifically, to a telecommunication system configured to automatically provide temporary wireless telephone numbers to wireless call devices.

2. Description of the Prior Art

In a telecommunications network, a service control point ("SCP") provides call handling information to devices in the network using call processing applications within the SCP. Some examples of call handling information provided by the SCP include toll free number routing information and calling card processing information. For example, a telecommunications switch receives a call requiring call handling information to complete the call to a called number. Recognizing the need for the call handling information, the switch transmits a query message to the SCP. The SCP processes the query message and returns a response message containing the call handling information for the call. These query and response messages are typically Signaling System #7 (SS7) Transaction Capabilities Application Part (TCAP) protocol messages that are well known in the art.

A telecommunications resource provides services to a call and is sometimes referred to in the art as a service platform. For example, resources are used to collect and validate calling card numbers, toll free number pin codes, and provide menu options to callers. Where caller interaction is required to process a call, the network uses a "connect to resource" call processing application in the SCP to connect the call to an appropriate resource. The resource provides services to the call based on the called and calling number. After providing the service, the resource is disconnected and the call is routed to the call destination usually via one or more switches in the network.

In one example of the "connect to resource" call processing application, a telecommunications switch may receive a call that requires voice response interaction with a user before the call is connected to the called number. The switch processes the call and sends a query message to the SCP. The SCP generates a connect to resource response message for the switch that routes the call from the switch to the resource. The SCP also sends a context message containing call information to the resource. After receiving the call from the switch and the context information from the SCP, the resource plays prompts and collects digits from the caller. The resource processes the call by validating the digits and sending a transfer request message to the SCP. The SCP processes the transfer request message, disconnects the resource, and sends a response message to the switch that routes the call to the called number.

It is known in the art of telecommunications for wireless service providers to intercept call requests from unrecognized wireless call devices and route the call requests to an operator for service. In a typical example, a wireless switch receives the call request from the unrecognized wireless call device and generates a query message for the SCP. The SCP generates the connect to resource response message for the switch that routes the call request from the switch to the operator. The operator could manually register the wireless call device for service, arrange billing via a credit card or other source and connect the call to the called number. Finally, it is known in the art for wireless service providers to provide 911 call connection for unrecognized wireless devices.

SUMMARY OF THE INVENTION

The present invention advances the art by providing a communication system configured to provide temporary wireless telephone service to wireless call devices on a demand basis. The present communication system is configured to receive a registration request from a wireless call device that does not have a permanent wireless number. The communication system processes the registration request to automatically assign a temporary wireless telephone number to the wireless call device. The communication system then processes call requests from the wireless call device to connect calls between the wireless call device and called numbers. The wireless telephone number is selected from a pool of temporary wireless telephone numbers used to provide the temporary wireless service to wireless call devices. In some examples of the present communication system, the temporary wireless number is automatically released back into the pool of temporary wireless telephone numbers for reassignment to other wireless call devices, upon expiration of a pre-determined period of time. In another example of the present invention, the user of the wireless call device controls when the temporary wireless number is released back into the pool of temporary wireless numbers. Once assigned a temporary wireless telephone number, call requests from the wireless call device are processed using conventional wireless telephony call processing until the temporary wireless telephone number is released back into the pool of temporary wireless telephone numbers. Call requests following the release of the temporary wireless number require a reassignment of another temporary wireless number.

The present communication system comprises an SCP and a switching system. The switching system is configured to receive the registration request from the wireless call device and process the registration request to generate a registration message for the service control point. The service control point is configured to receive the registration message and process the registration message to automatically assign a temporary wireless telephone number to the wireless call device. The switching system then processes call requests from the wireless call device to complete calls to the called destination. The switching system could use the SCP to generate call handling information for the call requests or could process the call requests using internal logic to complete the calls to the called destinations.

A first advantage of the present communication system is that wireless communication service is provided to users on an as requested basis. A second advantage of the present communication system is that wireless service is provided to users who do not require permanent wireless service. For example, a user may purchase a new wireless call device and use the temporary wireless service and their old wireless call device for unanticipated, sporadic, or emergency communications. In another example, a user may wish to provide a wireless call device to guests, business associates, customers, or other individuals for a temporary period of time. A third advantage of the present communication system is that operator assistance is not required to register and collect billing information before connecting a call to a called number. A fourth advantage of the present communication system is that it permits recycling of the temporary wireless numbers for use by other wireless call devices as the numbers are released back into the pool of temporary wireless numbers. A fifth advantage of the present communication system is the temporary telephone number assignment is in response to receiving a registration request from the wireless call device without an associated wireless telephone number.

In the context of the present invention the first, second, third, fourth, etc. connotations used to reference the messages, the call requests, and the call handling information are used for the purpose of differentiating between different messages, call requests, and call handling information and are not used to indicate a message sequence, call sequence or processing sequence.

DETAILED DESCRIPTION OF THE PREFERRED EMBODIMENT

Figure 1:
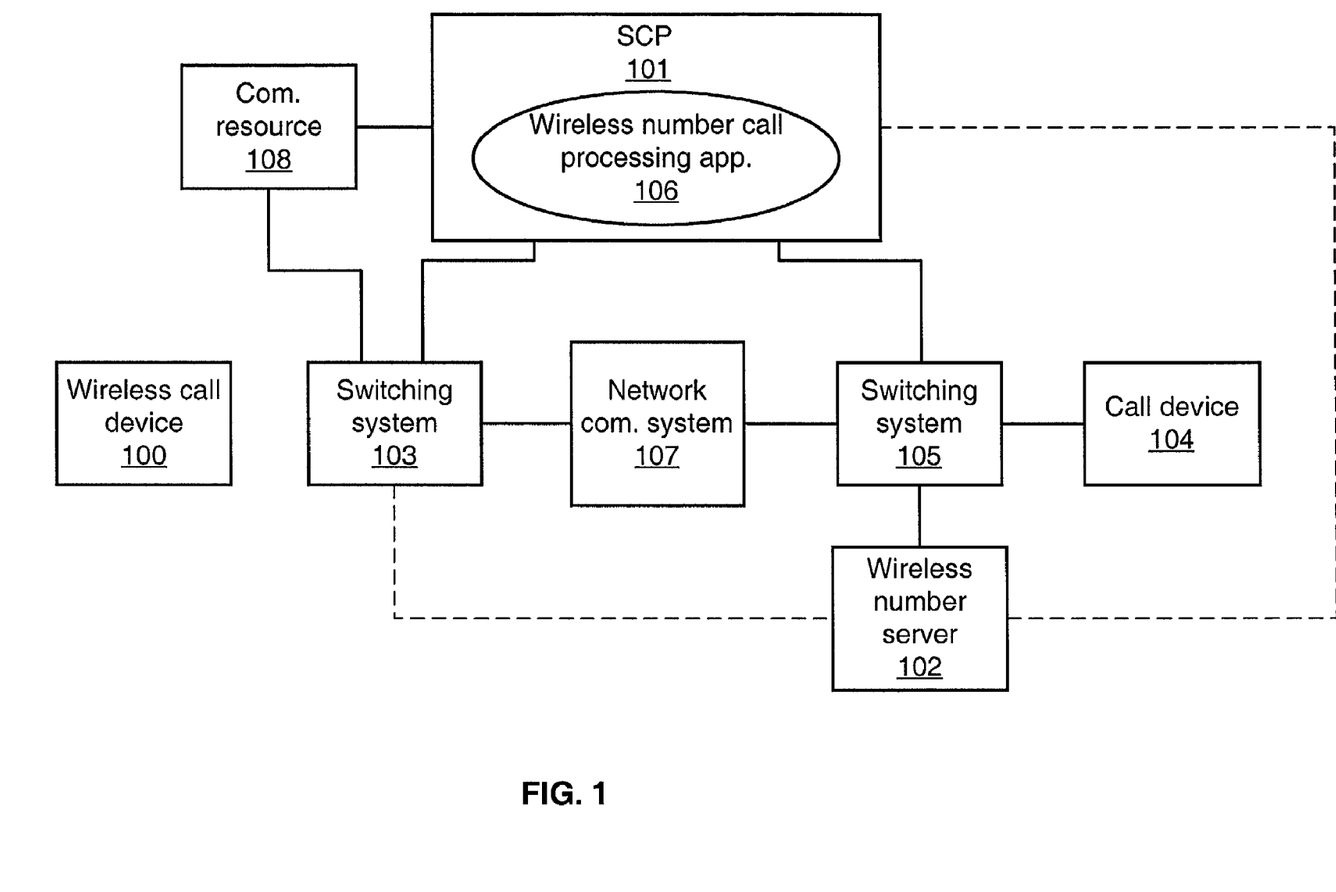
FIG. 1 illustrates an example of a network architecture for a communication system according to the present invention.

System Architecture—FIG. 1:

FIG. 1 depicts a wireless call device 100, a first switching system 103, a second switching system 105, an SCP 101, a wireless number server 102, a communication network system 107, a call device 104 and a communication resource 108. The SCP 101 comprises a wireless number call processing application 106. The switching system 103 is connected to the SCP 101, the communication network system 107, the wireless call device 100, and the communication resource 108. The switching system 105 is connected to the communication network system 107, the SCP 101, the call device 104 and the wireless number server 102. The SCP 101 is connected to the communication resource 108. As indicated by the dashed lines on FIG. 1, in some examples of the present invention, the switching system 103 and/or the SCP 101 could be directly connected to the wireless number server 102.

The wireless call device 100 could be any wireless device configured for wireless telephony communications. Some examples of the wireless call device 100 include without limitation, wireless telephones, pagers, personal data assistants ("PDA"), and computers. The call device 104 could be any wireless or wireline call device configured for telephony communications. Some examples of the call device 104 include without limitation, telephones, pagers, computers, and PDA's.

The switching system 103 could be any device or group of devices configured to receive a registration request from the wireless call device 100 and process the registration request to generate a registration message for the SCP 101. Subsequent to the assignment of a temporary wireless telephone number, the switching system 103 could also process call requests from the wireless call device 100 to complete calls to called destinations. The switching system 103 could also provide wireless switching services to a plurality of wireless call devices e.g. 100. Some examples of the switching system 103 include without limitation, a wireless switch, a wireless private branch exchange ("PBX"), a wireless base station unit or a packet switch.

The switching system 105 could be any device or group of devices configured to receive a query message from the SCP 101 and process the query message to generate another query message for the wireless number server 102 that includes a request for a temporary wireless telephone number. The switching system 105 could also process a response message from the wireless number server 102 to generate another response message for the SCP 101 that includes the temporary wireless telephone number. The switching system 105 could also provide switching services to a plurality wireless and/or wireline devices. Some examples of the switching system 105 include without limitation, a wireline PBX, a wireless PBX, a wireless base station unit or a packet switch.

The wireless number server 102 could be any device or group of devices configured to receive a query message from the switching system 105 and process the query message to select a temporary wireless telephone number from a pool of temporary wireless telephone numbers. The wireless number server 102 could also generate and provide a response message to the switching system 105 that includes the selected temporary wireless telephone number. The wireless number server 102 could also manage and maintain the pool of temporary wireless numbers for assignment to wireless call devices e.g. 100. In some examples of the present communication system, the wireless number server 102 could be a stand alone device as illustrated on FIG. 1. In other examples of the present communication system, the wireless number server 102 could be incorporated into the SCP 101 or the switching system 105. One example of the wireless number pool server 102 is a dynamic host configuration protocol server configured to dynamically assign the temporary wireless telephone numbers from the pool of temporary wireless telephone numbers to wireless call devices, e.g. 100.

The communications resource 108 could be any device or group of devices that provides services to a call. The communication resource 108 could provide automated caller interaction to a user of the wireless call device 100. Some examples of the communication resource include without limitation a voice response unit sometimes referred to in the art as an interactive voice response unit and an automated operator center.

The network communication system 107 could be one or more communication networks that provide one or more communication services. For example, the network communication system 107 could comprise the public switched telephone network ("PSTN"). In another example of the present invention, the network communication system 107 could comprise an asynchronous transfer mode ("ATM") network or an ATM network connected to an IP network and/or the PSTN. In yet another example of the present invention, the network communication system 107 could comprise a personal communication service ("PCS") network or PCS network connected to an ATM network and/or the PSTN or other networks. Finally, the network communication system 107 could be a Local Area Network ("LAN") or a LAN network connected to a Wide Area Network "(WAN") that is interconnected with other WANs by a data network, such as an IP, Frame Relay or ATM network. Those skilled in the art will appreciate that the network communication system 107 would include various conventional components not shown on FIG. 1 for clarity.

The SCP 101 could be any device or group of devices configured to receive a registration message from the switching system 103 and process the registration message to automatically assign a temporary wireless telephone number to the wireless call device 100. In response to a query message from the switching system 103, the SCP 101 could also generate and provide call handling information to the switching system 103 for call completion. The call handling information could be any information that routes the call requests to a number called by a user of the wireless call device 100. In some examples of the present communication system, the SCP 101 could use the wireless number call processing application 106 to automatically assign the temporary wireless telephone number to the wireless call device 100. The wireless call processing application 106 could be any application configured to assign a temporary wireless telephone number for a wireless call device e.g. 100. In some examples of the present invention, the call processing application 106 could be a home location register ("HLR") that is used to identify and/or verify a subscriber. The call processing application 106 could also contain subscriber data related to features and services according to the principles described herein.

In other examples of the present communication system, the SCP 101 could use the switching system 105 and the wireless number server 102 to automatically assign the temporary wireless telephone number to the wireless call device 100. For example, the SCP 101 could generate a query message for the switching system 105 that includes a request for the temporary wireless telephone number. The switching system 105 could process the query message to generate another query message for the wireless number server 102 that includes the request for the temporary wireless telephone number. The wireless number server 102 could then provide the temporary wireless telephone number to the SCP 101 via the switching system 105. In another example, the SCP 101 could query the wireless number server 102 for the temporary wireless number and process a response from the wireless number server to assign the temporary wireless telephone number to the wireless call device 100.

Figure 2:
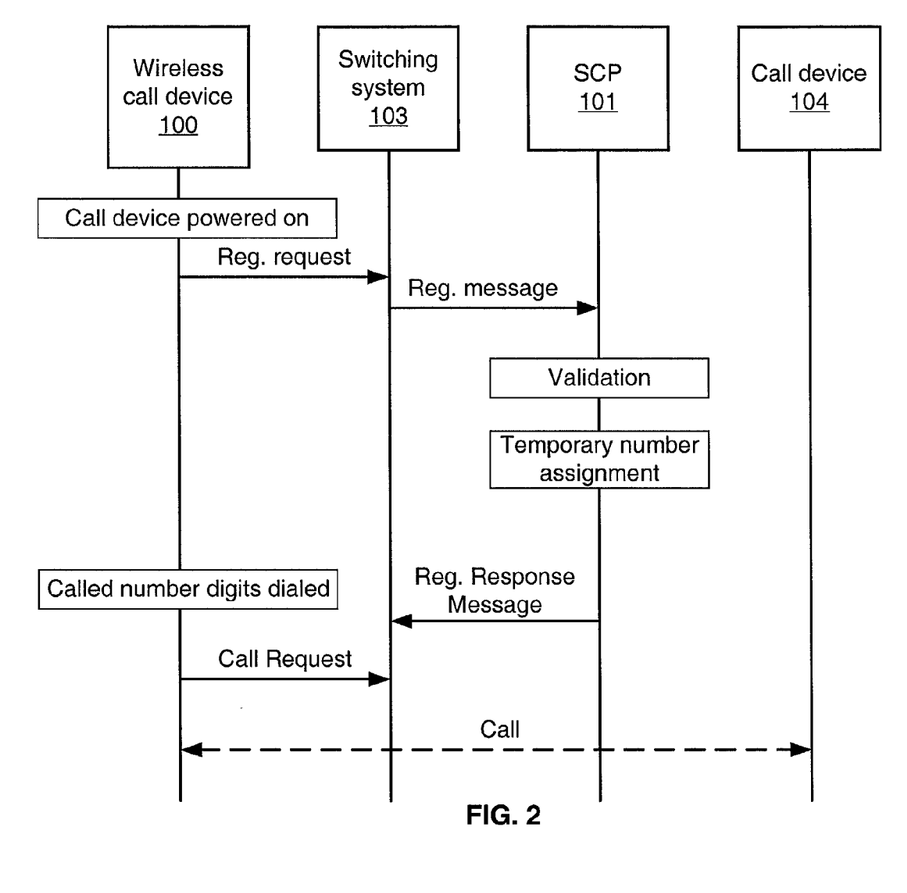
FIG. 2 is a message sequence chart illustrating an example of the operation of a communication system according to the present invention.

System Operation—FIGS. 2-7:

FIG. 2 is a message sequence chart illustrating an example of the operation of a communication system according to the present invention. It is anticipated however, that one skilled in the art will recognize numerous other examples in accordance with the principles described below, and thus, the following examples are for the purpose of illustration and not limitation. Those skilled in the art will also appreciate that various features described below could be combined with the above described embodiment to form multiple variations of the invention.

By way of background, a user of the wireless call device 100 registers with a service provider for the temporary wireless telephone number service. For example, the user could register the electronic serial number for the wireless call device 100 in a conventional manner with the temporary wireless telephone number service provider. The temporary wireless service provider could assign a mobile identification number ("MIN") to the wireless call device 100. The MIN could be either a valid public switched telephone network ("PSTN") number or could be a number that is invalid in the PSTN for authentication purposes. On FIG. 2 the operation begins when the user of the wireless call device 100 has a need for a wireless communication. In the example illustrated by FIG. 2, the user of the wireless call device would like to place a call to the call device 104.

The operation begins when the user of the wireless call device 100 turns on the wireless call device 100. In response to being switched on, the wireless call device 100 generates a registration request message for the switching system 103. In response to receiving the registration request from the wireless call device 100, the switching system 103 processes the registration request to generate a registration message for the SCP 101 that includes a request for registration information for the wireless call device 100. In response to receiving the registration message, the SCP 101 processes the registration message to validate the wireless call device 100. The validation process could be any process representative of identifying the wireless call device 100 and determining that the wireless call device 100 does or does not have a permanent wireless telephone number. The validation process could also include a determination that the wireless call device 100 is a subscriber to the temporary wireless number service. In response to validation of the wireless call device 100, the SCP 101 processes the registration message using the wireless number call processing application 106 to assign a temporary wireless telephone number to the wireless call device 100. In response to assigning the temporary wireless telephone number, the SCP 101 generates and provides a registration response message to the switching system 103 that includes the assigned temporary wireless telephone number.

The user then dials a telephone number for the call device 104. In response to the call placement, the wireless call device 100 generates a call request for the switching system 103. In response to receiving the call request, the switching system 103 process the call request to connect a call via the communication network system 107 to the call device 104. In some examples of the present invention, the switching system 103 could process the call request to connect the call to the call device 104 using internal call processing logic. In other examples of the present invention, the switching system 103 could generate query message for the SCP 101 that includes a request for call handling information and process a response message that includes the call handling information to connect the call to the call device 104.

Figure 3:
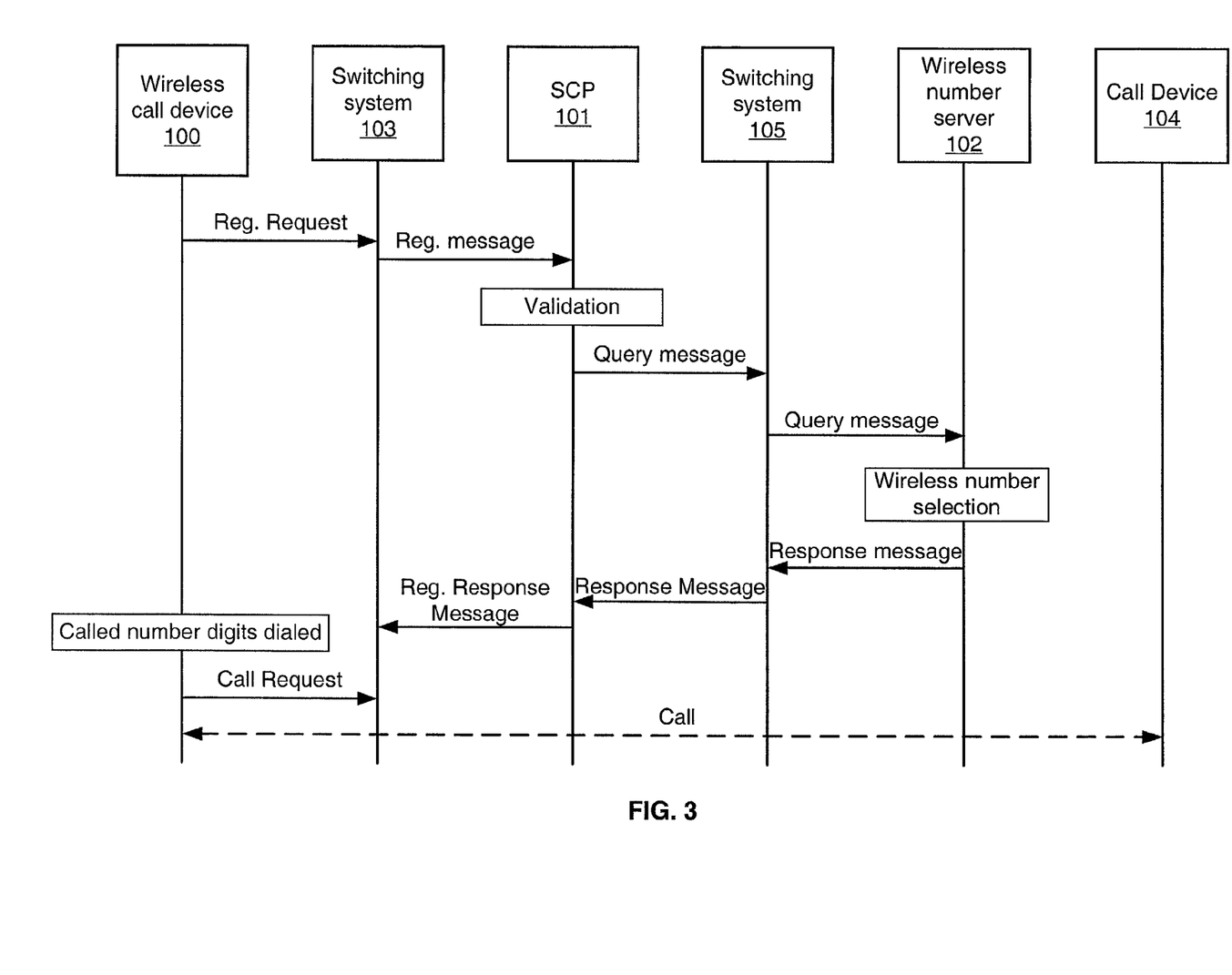
FIG. 3 is a message sequence chart illustrating another example of the operation of a communication system according to the present invention.

FIG. 3 is a message sequence chart illustrating another example of a call to the call device 104 from a wireless call device 100 that does not have a permanent wireless telephone number. On FIG. 3 the operation begins when the user of the wireless call device 100 turns on the wireless call device 100. In response to being switched on, the wireless call device 100 generates a registration request message for the switching system 103. In response to receiving the registration request from the wireless call device 100, the switching system 103 processes the registration request to generate a registration message for the SCP 101 that includes a request for registration information for the wireless call device 100. In response to receiving the registration message, the SCP 101 processes the registration message to validate the wireless call device 100. The validation process could be any process representative of identifying the wireless call device 100 and determining that the wireless call device 100 does or does not have a permanent wireless telephone number. The validation process could also include a determination that the wireless call device 100 is a subscriber to the temporary wireless number service. In response to validation of the wireless call device 100, the SCP 101 processes the registration message using the wireless number call processing application 106 to generate a query message for the switching system 105 that includes a request for a temporary wireless telephone number for the wireless call device 100. In response to receiving the query message from the SCP 101, the switching system 105 process the query message to generate another query message for the wireless number server 102 that includes the request for the temporary wireless telephone number. In response to receiving the query message from the switching system 105 the wireless number server 102 processes the query message to select a temporary wireless telephone number from a pool of available temporary wireless telephone numbers. The wireless number server 102 then generates a response message for the switching system 105 that includes the selected temporary wireless telephone number for the wireless call device 100. In response to receiving the response message from the wireless number server 102, the switching system 105 generates another response message for the SCP 101 that includes the selected temporary wireless telephone number. In response to receiving the response message from the switching system 105, the SCP 101 processes the response message to associate the temporary wireless telephone number with the wireless call device 100 and generates registration response message for the switching system 103 that includes the assigned temporary wireless number.

The user then dials the telephone number for the call device 104. In response to the call placement, the wireless call device 100 generates a call request for the switching system 103. In response to receiving the call request, the switching system 103 process the call request to connect a call via the communication network system 107 to the call device 104. As with the above example, the switching system 103 could process the call request to connect the call using internal call processing logic or query the SCP 101 for call handling information to connect the call to the call device 104.

Those skilled in the art will appreciate that numerous triggers could be defined that identify a wireless call device 100 without a permanent telephone number to the SCP 101. For example, the automatic number identification trigger for the wireless call device 100 could be set in the switching system 103. Still referring to FIG. 3, in an alternative example of the present communication system, the operation could begin when the user of the wireless call device 100 places a call. The call, however, could be placed to an access telephone number for the temporary wireless service. In this case, the operation would be identical to that of FIG. 3, except that the access telephone number could provide the trigger that indicates to the SCP 101 that the wireless call device 100 does not have a permanent wireless telephone number.

Figure 4:
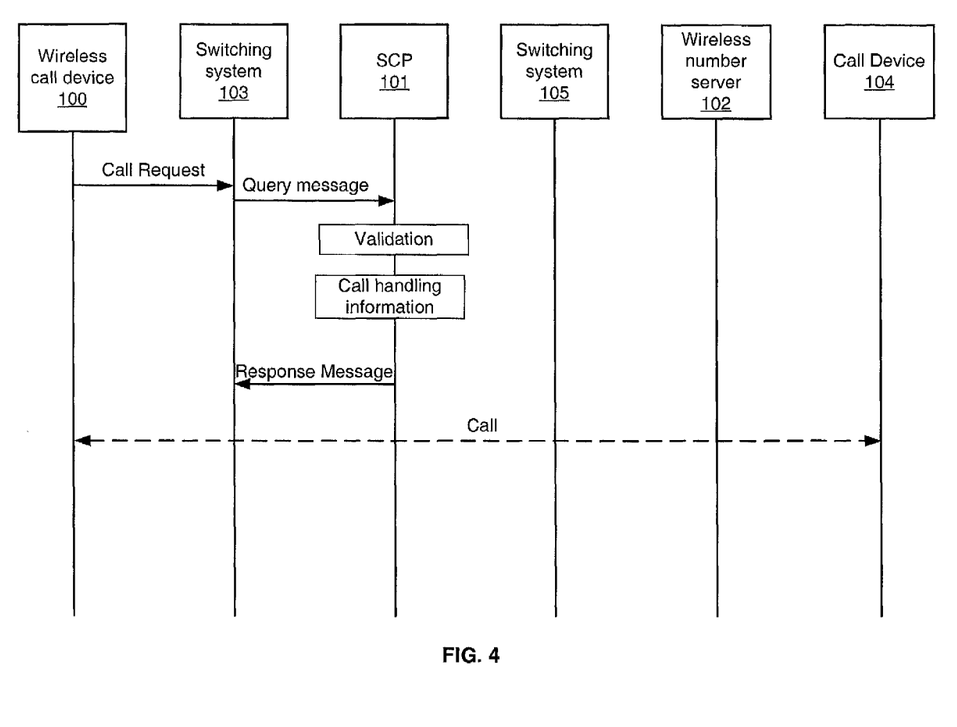
FIG. 4 is a message sequence chart illustrating another example of the operation of a communication system according to the present invention.

FIG. 4 is a message sequence chart illustrating an example of a call to the call device 104 from the wireless call device 100 after a temporary wireless number is assigned to the wireless call device 100. The example of FIG. 4 also illustrates call connection using the SCP 101 to generate the call handling information for the call. On FIG. 4 the operation begins when the user of the wireless call device 100 turns on the wireless call device 100. In response to being switched on the wireless call device 100 registers with the switching system 103 in a conventional manner. The user then dials a telephone number for the call device 104. In response to the call placement, the wireless call device 100 generates a call request for the switching system 103. In response to receiving the call request from the wireless call device 100, the switching system 103 processes the call request to generate a query message for the SCP 101 that includes a request for call handling information for the call request. In response to receiving the query message, the SCP 101 processes the query message to validate the wireless call device 100. The validation process could be any process representative of identifying the wireless call device 100 and determining that the wireless call device 100 does or does not have a permanent wireless telephone number. The validation process could also include a determination that the wireless call device 100 is a subscriber to the temporary wireless number service.

In this case, the SCP 101 identifies the wireless call device 100 and determines that a temporary wireless telephone number is currently assigned to the wireless call device 100 during the validation process. In response to the determination that a temporary wireless telephone number is assigned to the wireless call device 100, the SCP 101 processes the query message to generate call handling information for the switching system 103. In response to generating the call handling information, the SCP 101 generates a response message for the switching system 103 that includes the call handling information. The call handling information includes instructions to route the call request to the call device 104. In response to receiving the call handling information, the switching system 103 processes the call handling information to route the call request to the call device 104 via the communication network system 107 to complete the call.

Figure 5:
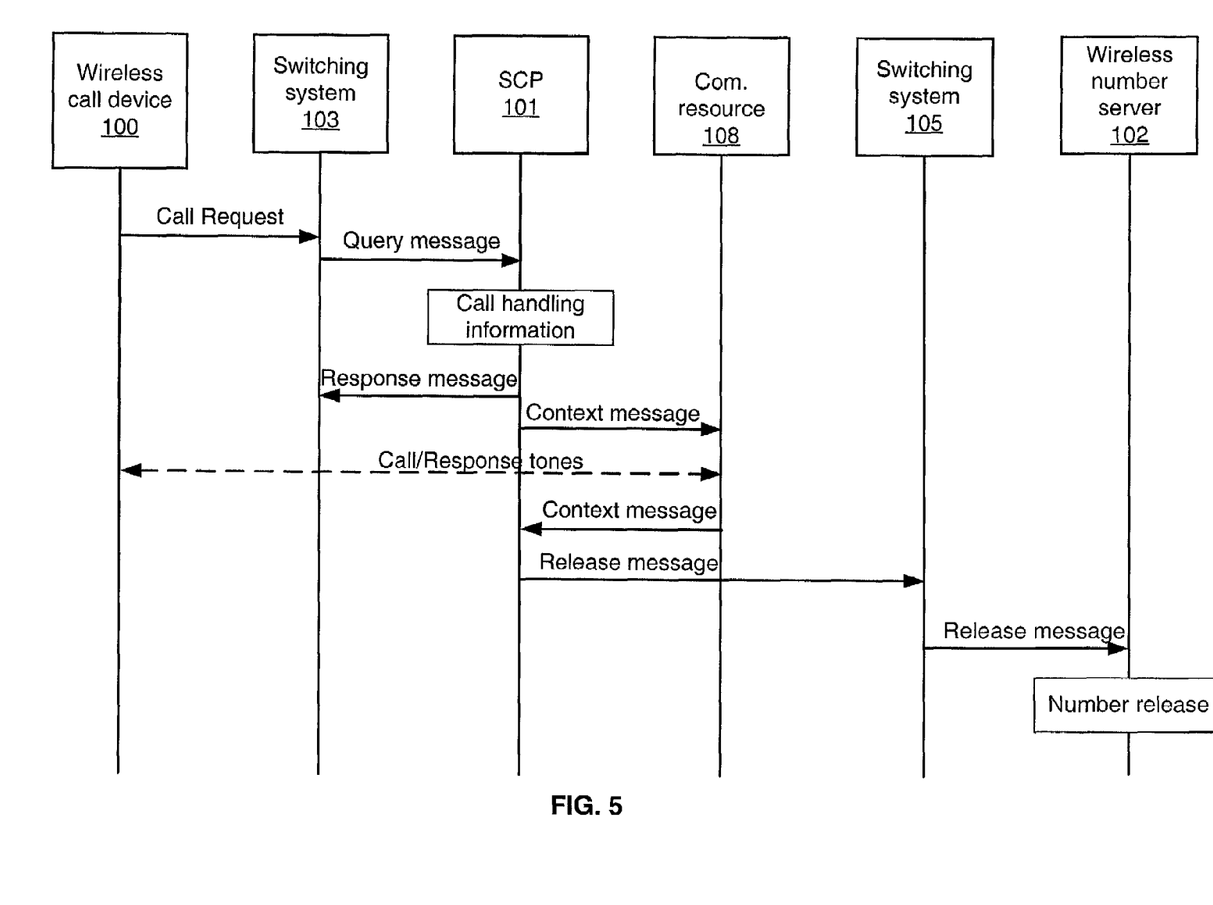
FIG. 5 is a message sequence chart illustrating another example of the operation of a communication system according to the present invention.

FIG. 5 is a message sequence chart illustrating one example of a release operation for the temporary wireless telephone number. Those skilled in the art will appreciate that the release of the temporary wireless telephone number could be accomplished by a variety of methods as a matter of design choice. For example, use of the temporary wireless telephone number could expire after a pre-defined period of time, triggering the automatic release of the temporary wireless telephone number. In another example, the user could control the release of the temporary wireless telephone number via a release call. For example the user could dial a release number and be connected to the communication resource 108, which provides menu options for the release of the temporary telephone number. In yet another example, the release of the temporary wireless telephone number could be accomplished through notification of the service provider. FIG. 5 illustrates an example of a release operation using the communication resource 108.

FIG. 5 the operation begins when the user of the wireless call device 100 places a call to a service telephone number. The service telephone number could be any number that routes the call to the communication resource 108 to provide service options for the user of the wireless call device 100. In response to the call placement, the wireless call device 100 generates a call request for the switching system 103. In response to receiving the call request from the wireless call device 100, the switching system 103 processes the call request to generate a query message for the SCP 101 that includes a request for call handling information for the call request. In response to receiving the query message, the SCP 101 processes the query message to generate the call handling information for the switching system 103 and provides a response message that includes the call handling information to the switching system 103. The call handling information includes a connect to resource instruction to route the call request to the communication resource 108. The SCP 101 also sends a context message to the communication resource 108 that includes context information for the call request. The context information could include the assigned temporary wireless telephone number. The context information could also include billing information such as time used and current account charges. The context information could also include an expiration date for the temporary wireless telephone number.

In response to receiving the response message, the switching system 103 processes the call handling information to connect the call to the communication resource 108. in response to receiving the call and the context information, the communication resource 108 provides a voice menu for the user of the wireless call device 100 to select from. The menu could include various options for the user of the wireless call device 100. For example, the menu could include an option for releasing the temporary wireless telephone number. The menu could include an option for obtaining the current billing information for the temporary wireless telephone number. In the case where the temporary wireless telephone number is scheduled to automatically release after expiration of the predetermined period of time, the menu could include an option for extending usage of the temporary wireless telephone number for another pre-determined period of time. The menu could also include an option for extending the usage of the temporary wireless telephone number for an indefinite period of time.

In response to receiving response tones from the wireless call device 100 corresponding to a selected menu option, the communication resource 108 processes the response tones to generate a context message for the SCP 101. The context message includes update information for the SCP 101 regarding the menu options chosen by the user of the wireless call device 100. In this case, the context message would indicate the release of the temporary wireless telephone number to the SCP 101. In response to receiving the context message from the communication resource 108, the SCP 101 generates a release message for the switching system 105. In response to receiving the release message, the switching system 105 processes the release message to generate another release message for the wireless number server 102. In response to receiving the release message from the switching system 105, the wireless number server 102 releases the temporary wireless number back into the pool of temporary wireless numbers for reassignment to another wireless call device. It should be noted that the SCP 101 also updates the wireless call processing application 106 with this information to dis-associate the temporary wireless number from the wireless call device 100.

In an alternative example where use of the temporary wireless telephone number expires after the predetermined period of time, the SCP 101 could automatically generate the release message for the switching system 105 in response to the expiration of the pre-determined period of time. In this case the switching system 105 processes the release message to generate the release message for the wireless number server 102 as illustrated by FIG. 5. In response to receiving the release message from the switching system 105, the wireless number server 102 releases the temporary wireless number back into the pool of temporary wireless numbers for reassignment to another wireless call device.

Figure 6:
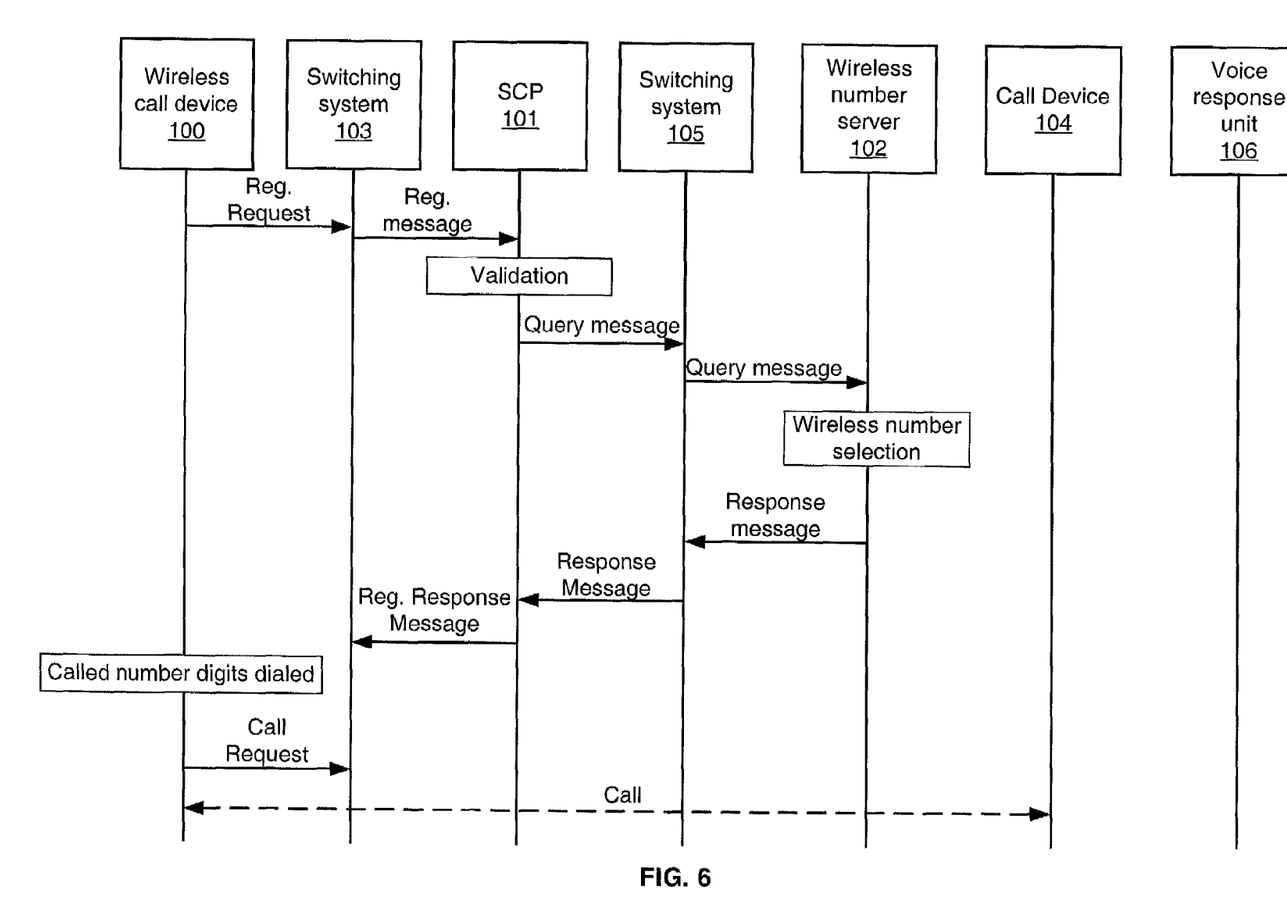
FIG. 6 is a message sequence chart illustrating another example of the operation of a communication system according to the present invention.

FIG. 6 is a message sequence chart illustrating another example of the operation of a communication system according to the present invention. On FIG. 6 the operation begins when the user of the wireless call device 100 turns on the wireless call device 100. In response to being switched on, the wireless call device 100 generates a registration request message for the switching system 103. In response to receiving the registration request from the wireless call device 100, the switching system 103 processes the registration request to generate a registration message for the SCP 101 that includes a request for registration information for the wireless call device 100. In response to receiving the registration message, the SCP 101 processes the registration message to validate the wireless call device 100. In response to validation of the wireless call device 100, the SCP 101 processes the registration message using the wireless number call processing application 106 to generate a query message for the switching system 105 that includes a request for a temporary wireless number for the wireless call device 100. In response to receiving the query message from the SCP 101, the switching system 105 process the query message to generate another query message for the wireless number server 102 that includes the request for the temporary wireless telephone number. In response to receiving the query message from the switching system 105 the wireless number server 102 processes the query message to select a temporary wireless telephone number from a pool of available temporary wireless telephone numbers. The wireless number server 102 then generates a response message for the switching system 105 that includes the selected temporary wireless telephone number for the wireless call device 100. In response to receiving the response message from the wireless number server 102, the switching system 105 generates another response message for the SCP 101 that includes the selected temporary wireless telephone number. In response to receiving the response message from the switching system 105, the SCP 101 processes the response message to associate the temporary wireless telephone number with the wireless call device 100 and generates the registration response message for the switching system 103.

The user then dials the telephone number for the call device 104. In response to the call placement, the wireless call device 100 generates a call request for the switching system 103. In response to receiving the call request, the switching system 103 process the call request to connect a call via the communication network system 107 to the call device 104. As with the above example, the switching system 103 could process the call request to connect the call using internal call processing logic or query the SCP 101 for call handling information to connect the call to the call device 104.

Figure 7:
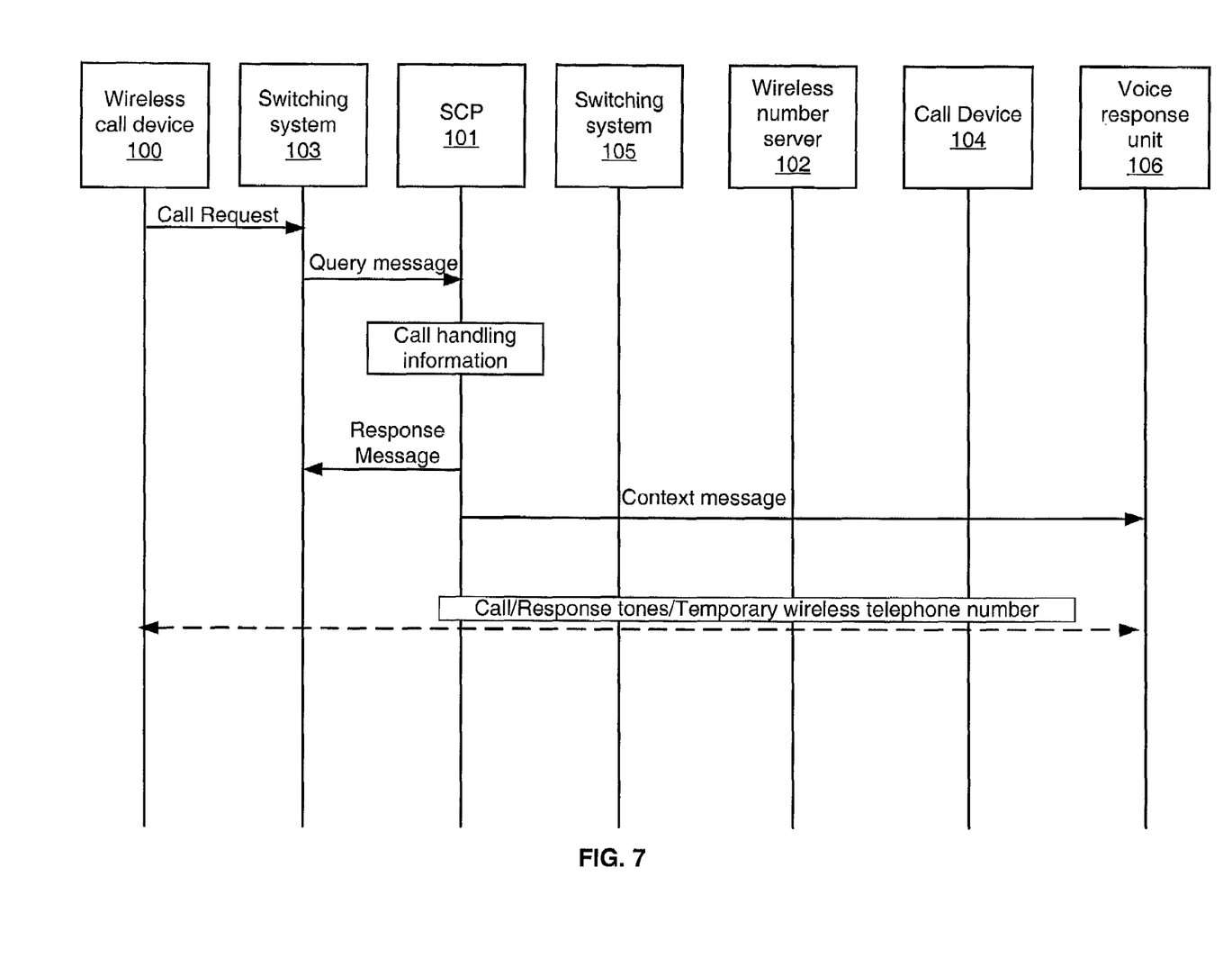
FIG. 7 is a message sequence chart illustrating another example of the operation of a communication system according to the present invention.

FIG. 7 is a message sequence chart illustrating a method for providing the assigned temporary telephone number to the user of the wireless call device 100. Upon completion of the call to the call device 104, which triggers the automatic assignment of the temporary wireless telephone number, the user of the wireless call device 100 places a second call to the service telephone number. In response to the placement of the second call, the wireless call device 100 generates a call request for the switching system 103. In response to receiving the call request from the wireless call device 100, the switching system 103 processes the call request to generate a query message for the SCP 101 that includes a request for call handling information for the call request. In response to receiving the query message, the SCP 101 processes the query message to generate the call handling information for the switching system 103 and provides a response message including the call handling information to the switching system 103. The call handling information includes the connect to resource instruction to route the call request to the communication resource 108. The SCP 101 also sends a context message to the communication resource 108 that includes context information for the call request. In response to receiving the response message, the switching system 103 process the call handling information to connect a call to the communication resource 108. In response to receiving the call and the context information the communication resource 108 provides the voice menu options for the user of the wireless call device 100 to select from.

In response to receiving response tones from the wireless call device 100 corresponding to the menu option for obtaining the wireless telephone number, the communication resource 108 processes the response tones to provide the wireless telephone number to the user of the wireless call device 100. In response to receiving the temporary wireless telephone number the user terminates the call.

The above-described elements can be comprised of instructions that are stored on storage media. The instructions can be retrieved and executed by a processor. Some examples of instructions are software, program code, and firmware. Some examples of storage media are memory devices, tape, disks, integrated circuits, and servers. The instructions are operational when executed by the processor to direct the processor to operate in accord with the invention. The term "processor" refers to a single processing device or a group of inter-operational processing devices. Some examples of processors are integrated circuits and logic circuitry. Those skilled in the art are familiar with instructions, processors, and storage media.

I claim:

1. A communication system for providing temporary wireless telephone numbers, the system comprising:
   a first switching system configured to automatically receive a registration request from a wireless call device without an assigned telephone number when the wireless call device is powered on, and process the registration request to generate a registration message; and
   a service control point configured to receive the registration message, process the registration message to determine if the wireless call device is subscribed to a temporary wireless number service, and responsive to determining that the wireless call device is subscribed to the temporary wireless number service, process the registration message to automatically assign a temporary public switched telephone network (PSTN) number to the wireless call device and generate and provide a registration response message to the first switching system that includes the temporary PSTN number.

2. The system of claim 1 wherein subsequent to receiving the registration response message from the service control point, the first switching system is configured to receive a call request from the wireless call device and process the call request to complete a call to a called number.

3. The system of claim 1 wherein the service control point is configured to process the registration message to validate the wireless call device.

4. The system of claim 1 wherein the service control point is configured to process the registration message to generate and provide a first query message that includes a request for the temporary PSTN number.

5. The system of claim 4 further comprising:
   a second switching system configured to receive the first query message and process the first query message to generate a second query message that includes the request for the temporary PSTN number and process a first response message to generate a second response message for the service control point that includes the temporary PSTN number; and
   a wireless telephone number server configured to receive the second query message from the second switching system and process the second query message to select the temporary PSTN number from a pool of temporary PSTN numbers and generate and provide the first response message to the second switching system.

6. The system of claim 5 wherein the service control point is configured to process the second response message to associate the temporary PSTN number with the wireless call device and generate and provide the registration response message to the first switching system.

7. The system of claim 5 wherein the service control point is configured to generate and provide a context message that includes the temporary PSTN number.

8. The system of claim 7 further comprising a voice response unit configured to receive the context message and a second call request from the wireless call device and process the second call request to provide the temporary PSTN number to a user of the wireless call device.

9. The system of claim 8 wherein the service control point is configured to generate and provide billing information to the voice response unit and the voice response unit is configured to provide the billing information to the user of the wireless call device in response to a fifth call request from the wireless call device.

10. The system of claim 5 wherein the first switching system is configured to receive a third call request from the wireless call device and process the third call request to generate a third query message that includes a request for call handling information and the service control point is configured to receive the third query message and process the third query message to generate and provide the call handling information to the first switching system, wherein the call handling information includes instructions to route the call request to a second called number.

11. The system of claim 5 wherein the service control point is configured to automatically release the temporary PSTN number back into the pool of temporary PSTN numbers after a predetermined period of time.

12. The system of claim 11 wherein the predetermined period of time is one day.

13. The system of claim 11 wherein the predetermined period of time is one week.

14. The system of claim 11 wherein the predetermined period of time is one month.

15. The system of claim 11 wherein the voice response unit is configured to receive a fourth call request from the wireless call device and process the fourth call request to generate a first release message for the service control point and the service control point is configured to process the first release message to generate a second release message for the second switching system and the second switching system is configured to process the second release message to generate a third release message for the wireless number server and the wireless number server is configured to release the temporary PSTN number back into the pool of temporary PSTN numbers.

16. The system of claim 15 wherein the service control point is configured to generate and provide the second release message in response to an expiration of the predetermined period of time.

17. The system of claim 11 wherein the voice response unit is configured to receive a sixth call request from the wireless call device and process the sixth call request to generate a request message for the service control point that includes a request for an extension of the predetermined period of time and the service control point is configured to process the request message to extend the predetermined period of time.

18. A method for operating a communication system that provides temporary wireless telephone numbers, the method comprising:

automatically receiving a registration request in a first switching system from a wireless call device when the wireless device is powered on;

processing the registration request to generate a registration message for a service control point;

receiving the registration message in the service control point;

processing the registration message to determine if the wireless call device is subscribed to a temporary wireless number service;

responsive to determining that the wireless call device is subscribed to the temporary wireless number service, processing the registration message to automatically assign a temporary public switched telephone network (PSTN) number to the wireless call device and generate a registration response message for the first switching system that includes the temporary PSTN number; and providing the registration response message to the first switching system.

19. The method of claim 18 the method further comprising:

receiving a call request from the wireless call device in the first switching system subsequent to receiving the registration response message from the service control point; and processing the call request to complete a call to a called number.

20. The method of claim 18 the method further comprising:

processing the registration message in the service control point to validate the wireless call device.

21. The method of claim 18 the method further comprising:

processing the registration message in the service control point to generate a first query message that includes a request for the temporary PSTN number; and providing the first query message.

22. The method of claim 21 the method further comprising:

receiving the first query message in a second switching system;

processing the first query message to generate and provide a second query message that includes the request for the temporary PSTN number;

receiving the second query message in a wireless telephone number server;

processing the second query message to select the temporary PSTN number from a pool of temporary PSTN numbers and generate and provide a first response message to the second switching system; and processing the first response message in the second switching system to generate and provide a second response message to the service control point that includes the temporary PSTN number.

23. The method of claim 22 the method further comprising:

processing the second response message in the service control point to associate the temporary PSTN number with the wireless call device; and generating and providing the registration response message to the first switching system.

24. The method of claim 22 the method further comprising:

receiving a third call request in the first switching system from the wireless call device;

processing the third call request to generate a third query message for the service control point that includes a request for call handling information; and receiving the third query message in the service control point and processing the third query message to generate and provide the call handling information to the first switching system, wherein the call handling information includes instructions to route the call request to a second called number.

25. The method of claim 22 the method further comprising:

generating a context message in the service control point that includes the temporary PSTN number; and providing the context message to a voice response unit.

26. The method of claim 25 the method further comprising receiving the context message in the voice response unit;

receiving a second call request from the wireless call device in the voice response unit; and processing the second call request to provide the temporary PSTN number to a user of the wireless call device.

27. The method of claim 26 the method further comprising:

generating billing information in the service control point and providing the billing information to the voice response unit;

receiving a fifth call request in the voice response unit; and providing the billing information to the user of the wireless call device in response to the fifth call request from the wireless call device.

28. The method of claim 25 the method further comprising:

automatically releasing the temporary PSTN number back into the pool of temporary PSTN numbers after a predetermined period of time.

29. The system of claim 28 wherein the predetermined period of time is one day.

30. The system of claim 28 wherein the predetermined period of time is one week.

31. The system of claim 28 wherein the predetermined period of time is one month.

32. The method of claim 28 the method further comprising:

receiving a fourth call request in the voice response unit from the wireless call device and processing the fourth call request to generate a first release message for the service control point;

processing the first release message in the service control point to generate a second release message for the second switching system;

processing the second release message in the second switching system to generate a third release message for the wireless number server;

processing the third release message in the wireless number server to release the temporary PSTN number back into the pool of temporary PSTN numbers.

33. The method of claim 32 the method further comprising:

generating the second release message in the service control point in response to an expiration of the predetermined period of time; and providing the second release message to the second switching system.

34. The method of claim 28 the method further comprising:

receiving a sixth call request from the wireless call device in the voice response unit;

processing the sixth call request to generate a request message for the service control point that includes a request for an extension of the predetermined time period;

processing the request message in the service control point to extend the predetermined period of time.

35. A communication system for providing temporary wireless telephone numbers, the system comprising:

a first switching system configured to receive a registration request from a wireless call device without an assigned telephone number when the wireless device dials an access number, process the registration request to generate a registration message; and a service control point configured to receive the registration message, including the dialed number, process the registration message to determine if the wireless call device is subscribed to a temporary wireless number service, and responsive to determining that the wireless call device is subscribed to the temporary wireless number service, process the registration message to automatically assign a Public switched telephone network (PSTN) number to the wireless call device and generate and provide a registration response message to the first switching system that includes the temporary PSTN number.

* * * * *